April 26, 1938. W. J. HOGG 2,115,365
COLLAPSIBLE TAP FOR PIPE COUPLINGS
Filed Dec. 6, 1934   5 Sheets-Sheet 1

INVENTOR
William J. Hogg
by [signature]
ATTORNEY

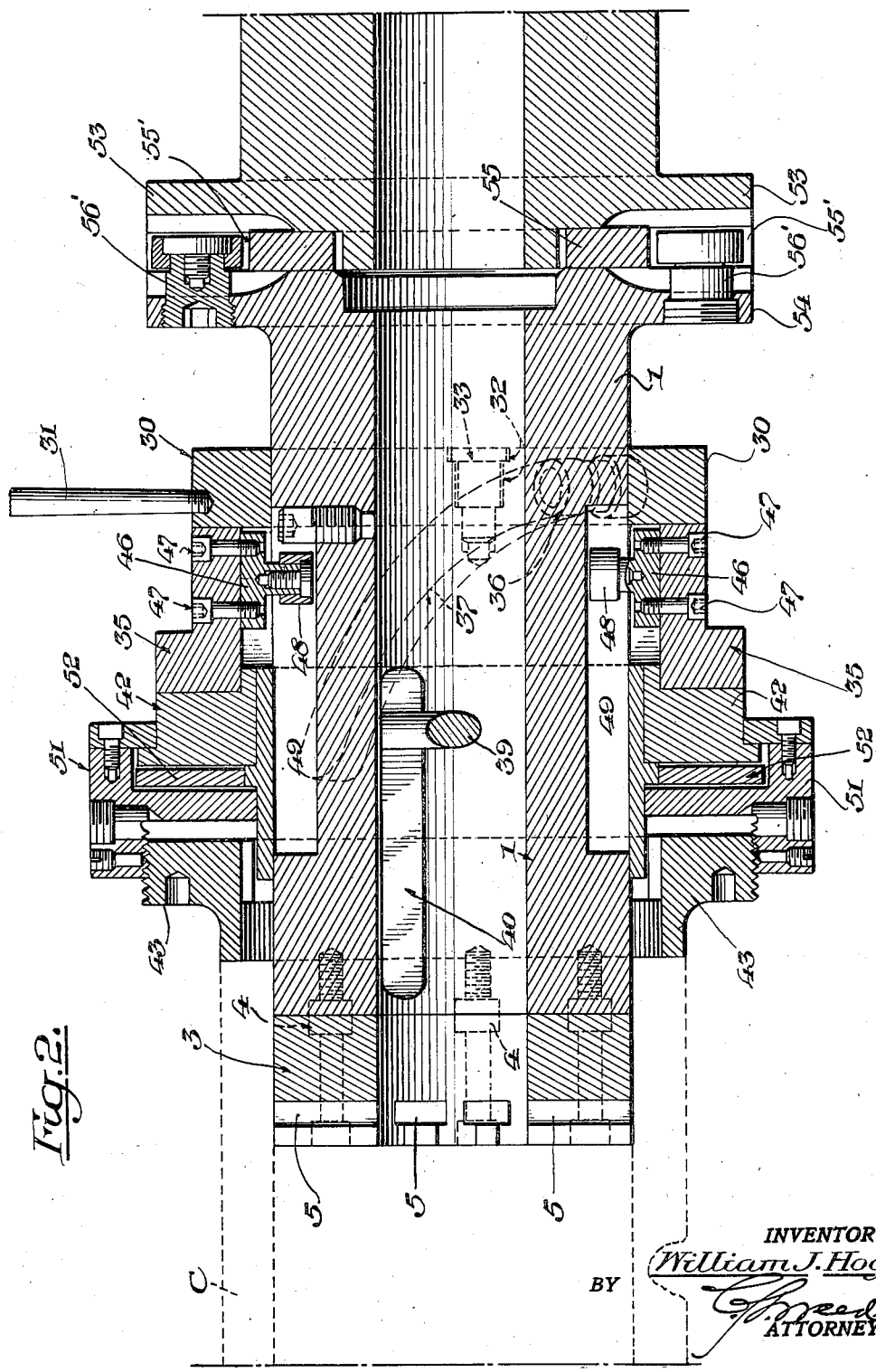

April 26, 1938.  W. J. HOGG  2,115,365
COLLAPSIBLE TAP FOR PIPE COUPLINGS
Filed Dec. 6, 1934  5 Sheets-Sheet 3
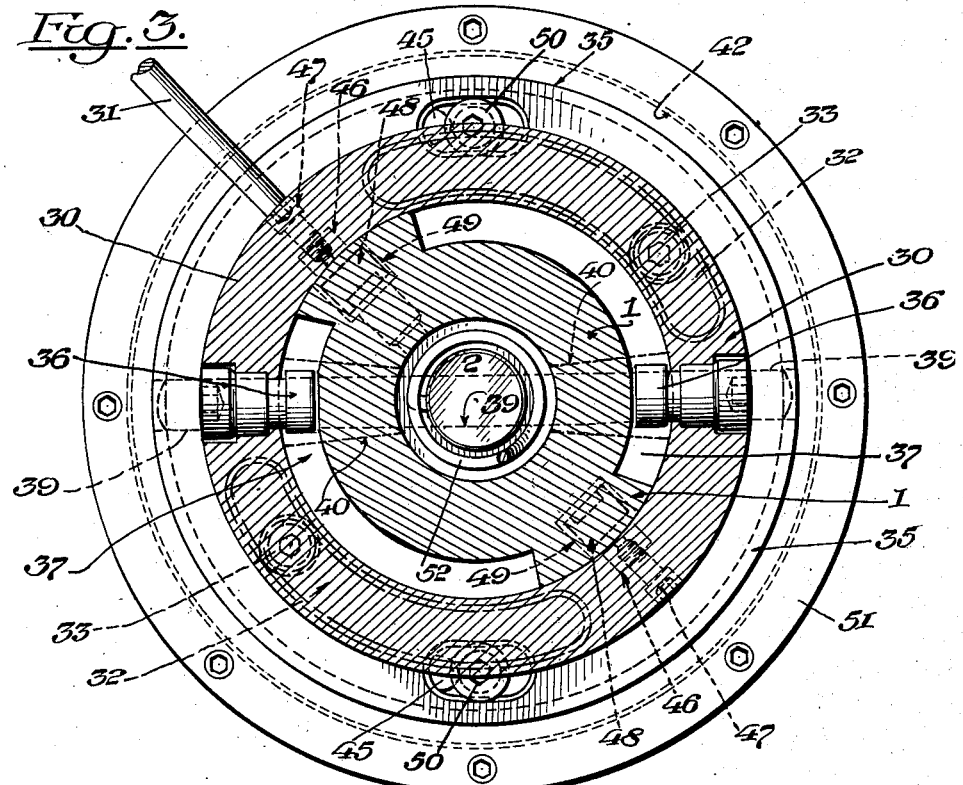
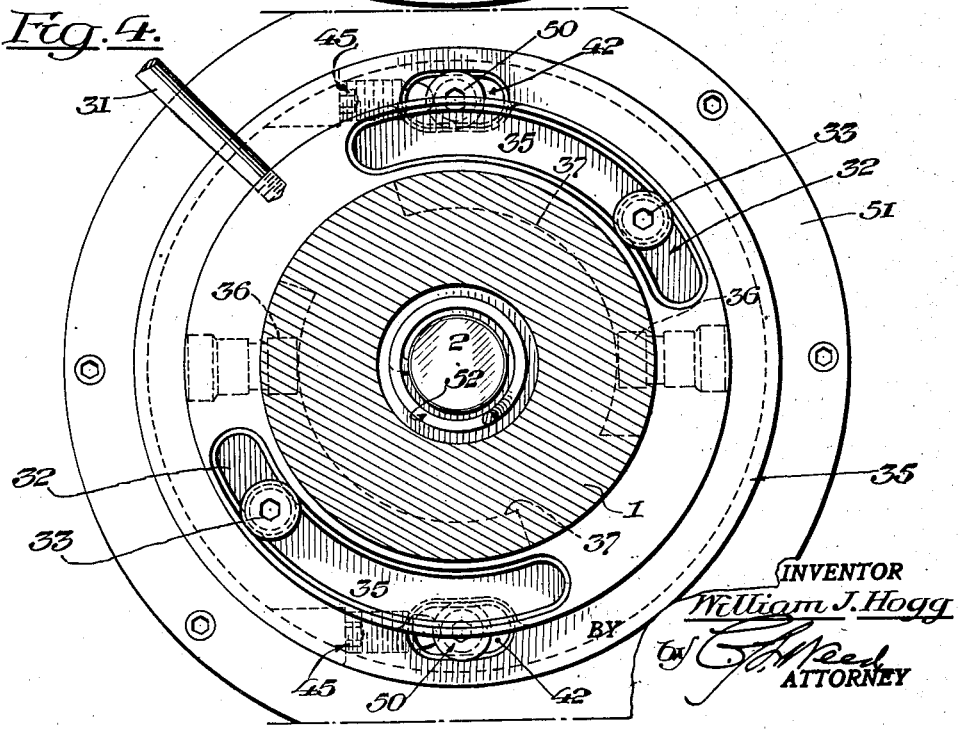
INVENTOR
William J. Hogg
ATTORNEY April 26, 1938.  W. J. HOGG  2,115,365
COLLAPSIBLE TAP FOR PIPE COUPLINGS
Filed Dec. 6, 1934     5 Sheets-Sheet 4
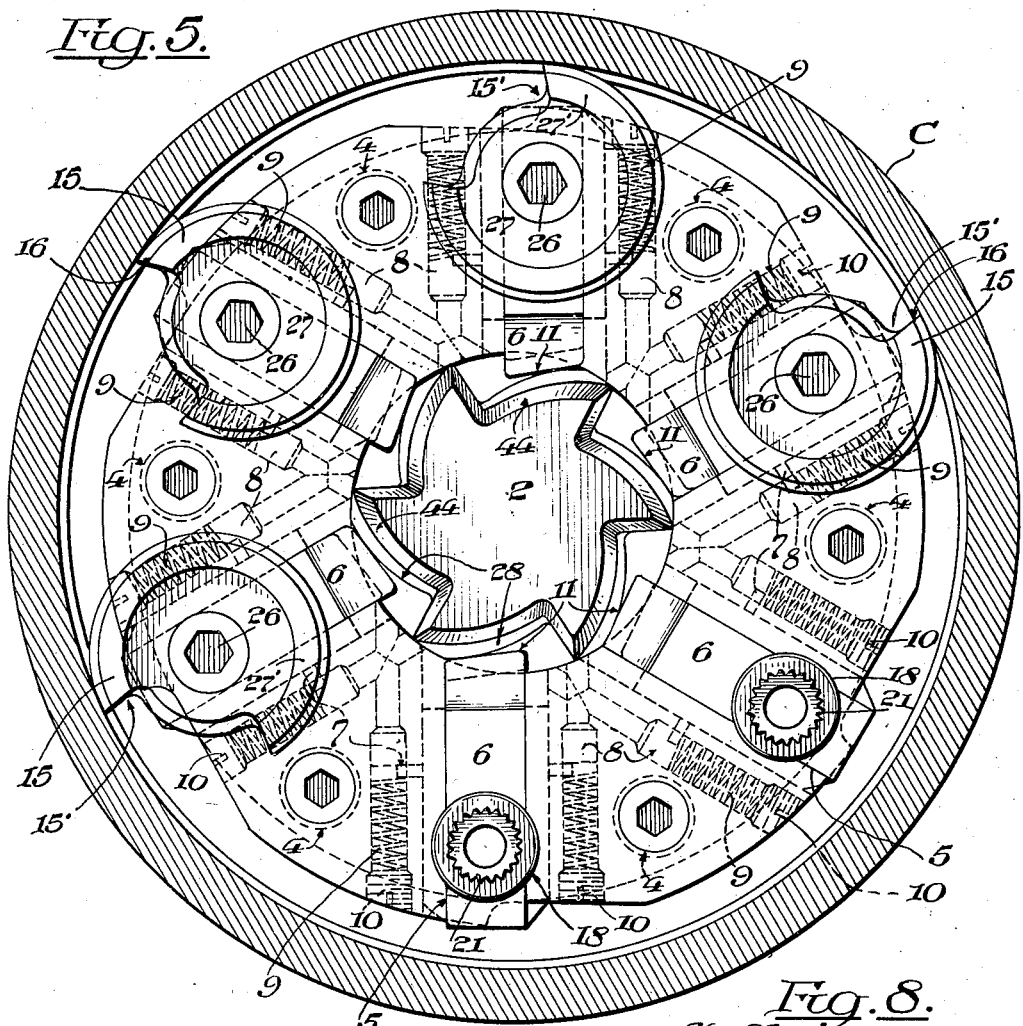
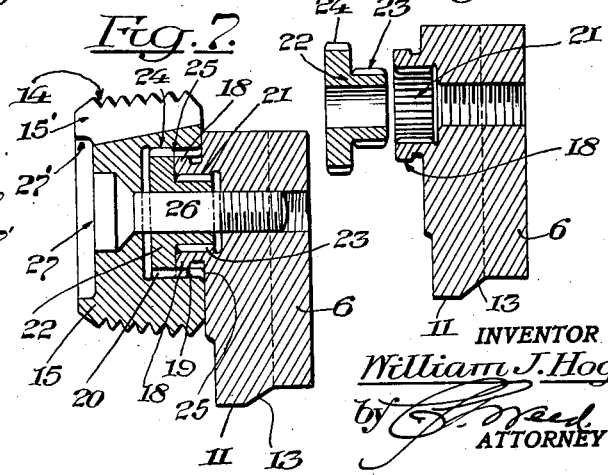
INVENTOR
William J. Hogg
by  ATTORNEY April 26, 1938. W. J. HOGG 2,115,365
COLLAPSIBLE TAP FOR PIPE COUPLINGS
Filed Dec. 6, 1934 5 Sheets-Sheet 5
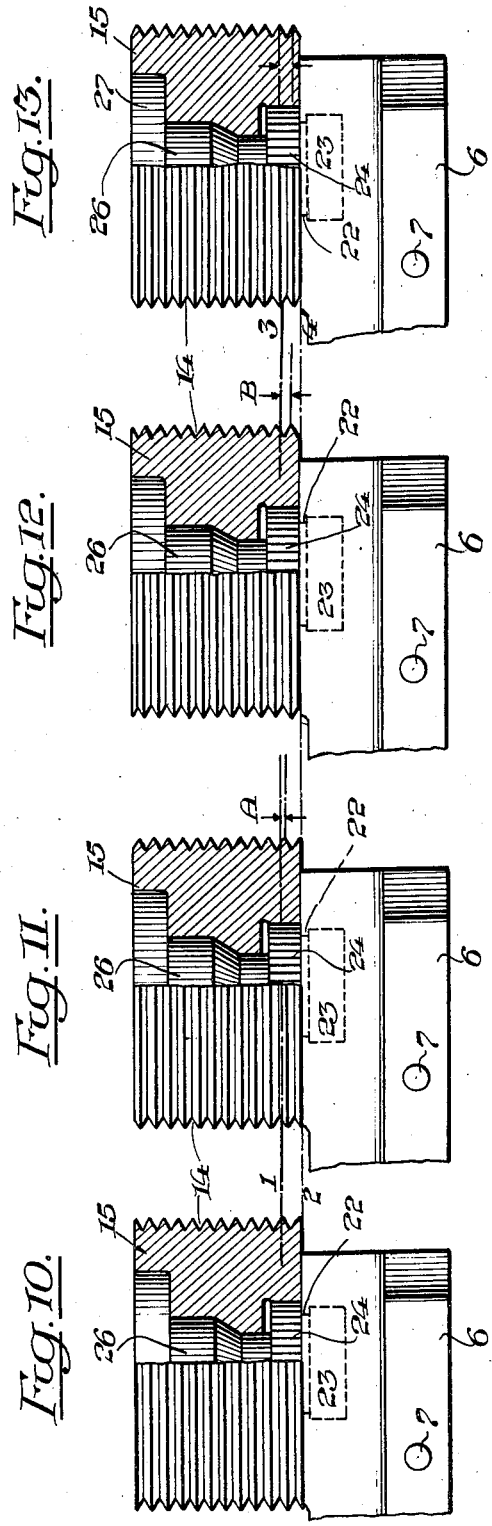
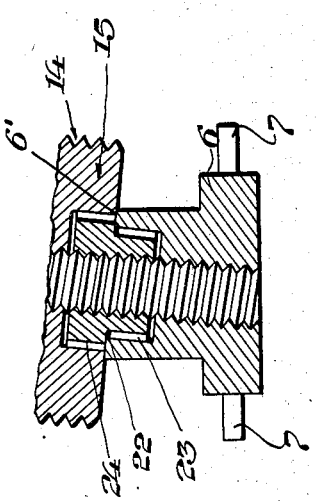
INVENTOR
William J. Hogg
BY
ATTORNEY Patented Apr. 26, 1938

2,115,365

UNITED STATES PATENT OFFICE 2,115,365

COLLAPSIBLE TAP FOR PIPE COUPLINGS

William J. Hogg, Cleveland, Ohio, assignor to The National Acme Company, Cleveland, Ohio, a corporation of Ohio Application December 6, 1934, Serial No. 756,229

16 Claims. (Cl. 10—145)

This invention relates to collapsible taps, the object of the invention being to provide an improved collapsible tap having circular chasers or cutters shiftable radially of the tap body and which, in the form shown, are automatically shiftable during the cutting of the pipe thread thereby to provide a receding tap effective to cut a tapered thread interiorly of the pipe or coupling, and which circular cutters are automatically collapsed when the thread has been cut, and adjustable for various diameters of pipe threads within the range of the tap.

A further object of the invention is the provision of an improved tap comparatively simple in construction and efficient in operation and in which the body of the tap may be utilized with interchangeable heads for threading different sizes or diameters of pipes or couplings, or carrying four, five or six and up to twelve circular chasers so that, in threading large sizes of pipe couplings, a large number of chasers may be used, thus distributing the depth of the cuts and obtaining a better and more accurate thread and also prolonging the life of the chasers by reducing the amount of grinding necessary of the chasers.

A still further object of the invention is the provision of a circular chaser collapsible receding tap having means for resetting the tap for starting the threading; means for adjusting the chasers or cutters to cut different diameters of threads within the range or limits of the tap; adjustable means for controlling the length of the thread to be cut; means for automatically collapsing the cutters when the thread has been cut, and means for cutting a tapered thread on the pipe or coupling, and which tap also embodies means whereby various sizes and numbers of cutters or chasers may be interchangeably used with the same tap body.

A further object of the invention is the provision of a circular chaser collapsible tap having a floating adapter or floating drive whereby the tap may be properly aligned in the event the coupling to be threaded does not line up perfectly with the driving spindle rotating the tap.

In the drawings accompanying and forming a part of this specification, Fig. 1 is a longitudinal section of this improved tap;

Fig. 2 is also a longitudinal section thereof at right angles to that shown in Fig. 1;

Fig. 3 is a cross sectional view taken on the line 3—3 of Fig. 1;

Fig. 4 is a cross sectional view taken on the line 4—4 of Fig. 1;

Fig. 5 is a cross sectional view taken on the line 5—5 of Fig. 1, illustrating a front view of the tap within the pipe coupling and with several of the circular chasers removed;

Fig. 6 is a front view of a chaser holding block with the chaser shown in dotted lines;

Fig. 7 is a transverse sectional view of Fig. 6;

Fig. 8 is a detail sectional view of the block and serrated bushing for positioning the chaser on the block;

Fig. 9 is also a sectional view of the chaser mounted in its block, and

Figs. 10 to 13 are partly sectional views of chasers and their blocks and illustrating the angular position or setting of the chasers with relation to each other.

Similar characters of reference indicate the corresponding parts in the several views.

Figure 1:
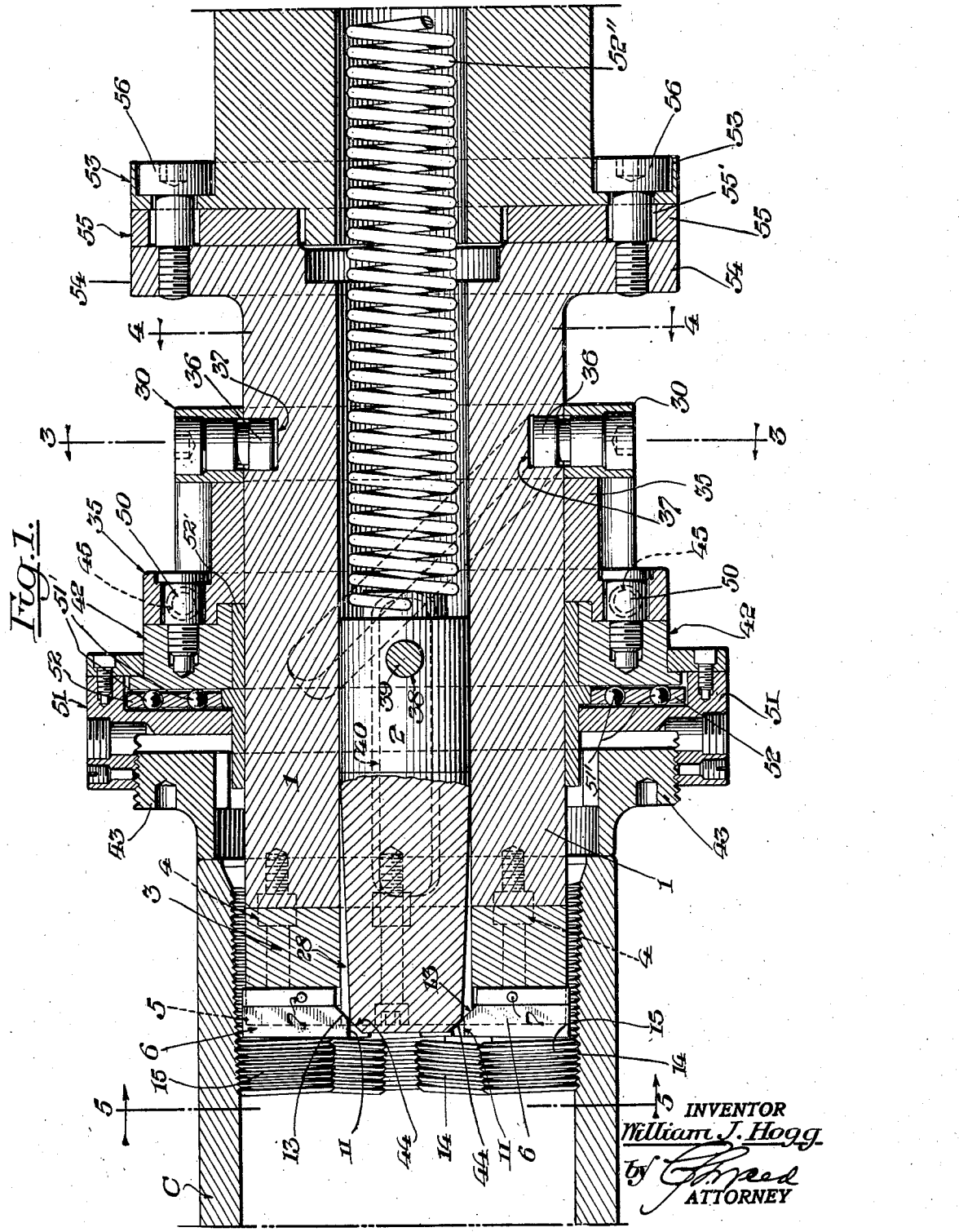

Before explaining in detail the present improvement and the mode of operation thereof, I desire to have it understood that the invention is not limited to the details of construction and arrangement of parts illustrated in the accompanying drawings since the invention is capable of other embodiments, and that the phraseology which I employ is for the purpose of description and not of limitation.

The tap is rotated from the rotating spindle of, and is fed forward in the way usual in standard machines of this type and in the present instance, is connected with the rotating spindle of the machine by a floating adapter hereinafter described. Of course, the work may be rotated relative to the tap and it will be understood that the forward travel of the tap is controlled by a lead screw similar to that on any standard threading machine.

The tap may also be used for cutting straight threads instead of tapered threads, in which case, of course, the core piece would not be tapered in the manner hereinafter described.

This improved tap, in the preferred form thereof, comprises a body 1 having an axial bore in which is located a core or core piece 2. This body 1 and core 2 have a relative longitudinal movement when assembled to cut tapered threads and also have a relative rotary movement for adjusting the cutters to cut various diameters of work.

At the front end of the body is located a detachable and interchangeable head or nose 3 secured to the body 1 by suitable bolts or screws and dowel bushings 4 whereby one head carrying a set of circular chasers may be removed and another head carrying a different number of chasers or different sizes of chasers substituted as the occasion may require so that it is only necessary to change the heads and blocks to take care of different sizes of couplings beyond the limits of adjustment of the chasers of each head.

These various heads may be used with the same tap body, thus materially reducing the investment of the customer as well as the cost of producing the taps.

The detachable head 3 is provided in the front face thereof with a series of radially located guide ways or recesses 5 for the reception of radially sliding chaser blocks 6 (see Figs. 6, 7 and 8), six thereof being shown in Fig. 5. Each of these recesses is T-shaped for the reception of a one-piece, stepped, correspondingly-shaped chaser block 6 to which the chasers are suitably secured.

Each of the chaser blocks 6 is provided with a pair of laterally extending pins 7 projecting into circularly formed slots 8 in the head and in these slots are located springs 9 held in place by screw plugs 10 and in position to engage the pins of the blocks to hold the blocks in engagement with the core piece 2 and also to shift the chaser blocks and thereby the chasers inwardly to collapse the chasers when the thread has been cut. This spring actuated means is thus effective to release the chasers from the work at the proper time.

Each of these chaser blocks is provided on its inner end with what is usually designated as a land or cam surface 11, curved circumferentially of the tap but straight in the direction of the depth of the tap for co-operation with suitable cam-formed surfaces 28 of the core 2 whereby, on the rotary adjustment of the core in the manner hereinafter described, the chaser blocks and thereby the chasers are adjusted to make the proper size of cut. In the rear of this land surface, the blocks are provided with an inclined or cam surface 13 adapted to co-operate with the angular end 44 of the core 2 whereby, at the proper time, the chasers may be released from the work through the medium of the spring actuated means hereinbefore described.

The front face of each supporting block is inclined transversely thereto as 6', see Fig. 9, whereby the chasers will be angularly set or inclined to the front face of the tap body, see Figs. 1 and 9, so that, while the grooves 14 of the chasers are cut circularly straight and not spirally, they yet have the effect of spirally cut grooves. The front faces of the die blocks thus being formed on an angle with relation to the front face of the tap body, gives the proper angular setting to the circular chasers and controls the proper cutting edge and clearance thereof.

Each of the chasers or cutters 15 is substantially circular but with a segmental or sectional part 15' thereof removed and has substantially straight parallel grooves 14 cut therein instead of spiral threads. These grooves terminate in a depthwise cutting edge 16.

Each circular chaser is turned and ground on a slight taper on the outside diameter to allow the proper clearance and guide for the chaser angle, the diameter at the front being less than that at the rear of the chaser with the result that the front portion of the chaser does the cutting while the rear portion guides or pulls the chaser on to the work with the grooves acting as a guide except for chasers used for short tapered threads where the full width of the chaser is engaged when cutting the threads.

By locating the chaser in an angular position on the chaser block, a proper clearance and lead for the thread is obtained and by using this angular location of the chaser, the chasers can be ground independently and not in sets of four or more which would be necessary were the chasers provided with spiral grooves. In other words, if the chasers were provided with spiral grooves, this would require that the entire set of chasers be ground on the cutting edge exactly the same to secure the proper cutting position and it is practically impossible for any operator to adjust them correctly.

All of the chasers of a set are formed exactly the same but the heighth from the rear face at the point of the cutting edge will vary so that, in manufacturing these chasers, all of the chasers are machined exactly the same until the last operation when the back faces of the chasers are ground to suit the position of the cutting edge and, consequently, the position of the circular chaser end-wise will always remain the same with relation to the top point of the thread. This is a very important point for, without this, the structure would be too complicated for the average operator to set and impractical for general use. After this grinding the top faces and chamfers of all of the chasers of the set are ground off exactly alike so that the chasers will all start to cut at the same time.

The grinding of the back face of the chaser in relation to the circular grooves depends upon the number of chasers used in the tap. For instance, if four chasers are used, the distance between the ground back face of the chaser to the center of the groove varies one-fourth of the distance between the grooves. Where six chasers are used, the distance between the grooves or pitch is divided by six, etc.

When milling or grinding the chaser grooves, it is necessary that the circular chaser blank be tipped at a predetermined angle equal to the same angle that it is tipped on the chaser block when mounted in place. This angle on the top face of the block is governed by the helix angle of the thread on the work being cut.

The lower diameter at the bottom of the chaser is greater than the diameter at the top or counter-bored section. This difference in diameter of the chaser is predetermined according to the pitch of the thread to be cut and the diameter of the work being threaded in order to keep the diameter of the circular chaser as large as possible. Therefore, to obtain the proper position of the chasers, each chaser is ground during the last operation on its back face to suit the particular position of the cutting edge in the tap body, a little more being ground off the back of one chaser than off the back of another, see Figs. 10 to 13. This grinding, however, is in a perfectly straight direction or plane and does not give the angularity of the chaser relative to the tap body as this is obtained by the angularity of the front face of the chaser blocks, but it does give the different positions of the chasers, as shown in Figs. 10 to 13, wherein it will be noted that, in Fig. 10, the distance between the lines 1—2 is less than it is between the lines 3—4 in Fig. 13, the letters A and B showing how the grinding gradually varies in the several chasers of the set.

The front face of each chaser block is provided centrally thereof with a forwardly extending, exteriorly ground ring or annular flange or pilot 18 for the reception of a similarly formed interiorly ground surface 19 located on the outer or rear side of the serrations 20 of the chaser 15.

These two ground surfaces form means for properly positioning and supporting the chaser on the block and this pilot is ground closely to fit within the chaser and is provided with a circular serrated opening 21 for the reception of a stepped serrated bushing 22 having a set of serrations thereon, for instance, 1/64th of an inch apart as at 23. This bushing also has an integral part of larger diameter in front thereof having serrations thereon, for instance, 1/32 of an inch apart as at 24. The chaser 15 has its back face provided with a serrated circular opening 25 corresponding to the serrations of the larger bushing and these several parts, the chaser, the detachable and rotatable two-section bushing and the chaser block are secured together by a screw or bolt 26 having a counter-bored front end for the reception of a suitable tool to release the chaser from its block, the screw being left-handed whereby the cutting of the chaser will tighten the screw. By means of this or a similar combination of serrations, not only is the setting and grinding of the chaser facilitated but the turning of the chaser on its block is prevented. The front face of the bushing is suitably graduated to facilitate the setting of the parts.

It will be understood, of course, that as each chaser is successively ground, it is moved around the serrations to bring the cutting edge thereof to the proper point. Thus, the serrated bushing acts as a means on which the circular chaser is mounted on the one-piece chaser block and insures that the cutting edge of the chaser be set in the proper position for cutting.

Each chaser is preferably counter-bored at its front end, as 27, forming a flanged chamber 27' and this not only provides a chip clearance when the chaser is cutting but permits the proper grinding of the chaser so that it will cut properly. The cut-away or removed segmental portion 15' along the length of the chaser forms a cutting edge with which the counter-bored front end intersects while the serrated opening in the back of the chaser is of less diameter than the counter-bored opening and does not intersect the cutting edge.

From the foregoing, it will be seen that if a bushing were used having only one set of serrations, for instance, 1/32 of an inch apart, which would be necessary in order that they not be too fine to support the chaser, and the circumference were one inch, then the chaser would have to have its cutting edge ground off 1/32 of its circumference each time it was ground, but by having a bushing of two diameters with different circumferentially spaced or graduated serrations, the result is that if, for instance, the number of serrations on the smaller bushing is less or approximately one-half of the number of serrations on the larger bushing, the chaser can be ground off 1/64 of an inch each time instead of 1/32 of its circumference.

In setting the chaser to a new position, the bushing is moved clock-wise one serration in the chaser block. The chaser is then set back anti-clockwise one serration. Now, if the smaller bushing has thirty serrations and the larger has forty serrations, this eliminates a full serration movement. In other words, there is a ratio of practically four to one.

To illustrate this, consider a 1/8" pipe chaser for a 3/8" tap die. 1" equals the diameter of the chaser which is 3.1416 in circumference. 3.1416 divided by thirty equals .1047 which is the movement when only moving the bushing clockwise in the chaser block and 3.1416 divided by forty equals .0785 which is the back movement when moving the chaser anti-clockwise on the bushing. Thus, we have moved the thirty serration circumference ahead one complete serration but have moved the chaser on the bushing back in proportion or in ratio of thirty to forty. Therefore, subtracting .0785 from .1047, the remainder is .0262, which is the amount left to grind off the face for the new setting. Thus, the amount to be ground off the circular chaser is in proportion as thirty is to forty.

It will thus be seen that I have provided an improved tap having circular chasers of improved form and construction together with improved means for supporting them, which supporting means includes means for predetermining the exact amount to be ground off the chaser at each grinding thereof while insuring not only long life to the chaser but an accurate setting of the chaser to correspond with such grinding.

Among the numerous advantages of this improved circular chaser is not only the longer life thereof as compared with the ordinary form of chaser because there are quite a few inches of periphery provided for grinding, but the chaser grooves can be readily circularly ground, the cutting edge is protected when the die is collapsed as the cutting edge is rolled away from the chip instead of dragging through and the heat is carried away from the cutting edge rapidly due to the large cross section of the chaser. The chaser can be readily made in a screw machine and has a natural clearance similar to a milled chaser. No backing off is required. The cutting edge can be readily sharpened and the chaser can be readily taken out and returned, and there is a reduction in the stock or number of chasers required to be carried on hand. Furthermore, the chasers can be used for right and left hand threads by simply changing the angle of the chaser block slide opposite to that for right hand thread cutting. It will be understood, of course, that the coarseness of the grooves of the circular chaser can be varied as may be desired.

The core piece 2 is provided with a series of circumferentially formed cam surfaces 28 corresponding with the number of chaser blocks and co-operating with the circumferentially formed cam surfaces 11 on the inner ends of the blocks (see Fig. 5). These cam surfaces somewhat resemble teeth or flutes and they taper longitudinally of the core piece, having the same taper that the threaded piece or pipe coupling is to have. Therefore, when various tapers are to be threaded on the work, the core pieces are changed for that purpose and are, therefore, interchangeable.

The tap body 1 is located within a suitable sectional housing made up of a series of rings or annular members and, therefore, mounted on the body is a ring 30 carrying a handle 31 by means of which this ring may be turned to set the chasers. In this ring 30 are two elongated slots 32 and in these slots are two stud screws 33 for securing the ring 30 to a ring 35 to prevent independent longitudinal movement while permitting rotative movement of the ring 30. The ring 30 is provided with two roller studs, the rollers 36 of which extend into spiral elongated slots 37 in the body 1 of the tap so that when the ring 30 is turned the rollers sliding in these spiral grooves cause the ring 30 to move along the body and being attached by the screws 33 to the ring 35, the other parts associated therewith on the outside of the body also move along in the same direction.

In the core piece 2 there is a fitted hole 38 for the reception of a cross pin 39 and this pin extends through an elongated slot 40 in the body 1 and into a fitted hole in a ring 42. This elongated slot 40 thus permits the movement of the rings just described on the tap body 1.

When the rings move forward or backward on the shifting of the handle 31, this cross pin 39 moves with the ring 42 and thus causes the core piece 2 to move forward or backward with the rings, depending on which way the ring 30 is turned. When the tap is set to start threading, the housing is in position so that a trip ring 43 contacts with the end of the coupling C to be threaded and the chasers do not quite contact with the bevel of the coupling. Thus, as the tap is brought to the coupling, the tap body 1, together with its chaser blocks and chasers are fed into the work and the ring 43 contacts with the face of the coupling C, stopping the forward travel of the housing rings with the body 1 of the tap and when so stopped, this, of course, stops the forward travel of the ring 42 together with the pin 39 and the core piece 2.

As the tap body 1 and its chasers 15 enter the work, the chaser blocks are bearing on the large end of the tapered core piece 2 since the slots 40 in the body 1 permit the front end of the core piece to project sufficiently beyond the chasers for this purpose when the chasers are set by the handle 31, and as the tap body 1 feeds into the work, the chaser blocks slide forwardly along the tapered core piece, held against longitudinal movement, toward the small end thereof. In the present improvement, by reason of the fact that the chaser blocks slide forwardly along the tapered core piece and the core held against movement during the cutting or threading of the work, the length of the thread in a piece of work is controlled by the exact length of the taper on the core piece so that the taper on the work is an exact copy of the taper on the core whereas, if the core piece moved relative to the cutters, the taper on the core could not be an exact copy of the taper on the work because the taper on the core would have to be longer and, being longer, would, therefore, have to be less than the taper on the work. There are many disadvantages in providing a core piece that moves relative to the cutters during the threading operation for, among other things, this would require complicated mechanical means to insure a proper timed movement due to the difference in angle between the tapered core and the tapered piece of work and this complicated mechanism would affect the accuracy of the work.

In the present application, the chaser is controlled directly by the taper on the core without any intermediate parts or leverage of any kind and the length of the taper on the core corresponds exactly with the length of the taper on the work, thus doing away with an increased length of core and, consequently, complicated mechanism to operate that core.

The thread is completed when the angle or inclined cam faces 13 on the ends of the circular chaser blocks reach the angle 44 at the end of the core piece 2 so that when the tap body 1 and its chasers 15 are moved further forward, these angles allow the chasers and blocks to collapse out of the thread. The tap can then be moved out of the coupling and the chasers reset by the handle 31 for the next threading.

The adjustment for diameter or size of coupling is obtained by two adjusting screws 45, see Fig. 4. In the ring 35 there are a pair of blocks 46, each secured to the ring 35 by two screws 47. On a stud of each block 46 is a roller 48 and these rollers slide in elongated slots 49 of the body 1, holding the ring 35 in place radially but allowing it to slide longitudinally.

The ring 42 is attached to the ring 35 by two stud screws 50 which pass through elongated slots in the ring 35 and this ring 35 carries the two adjusting screws 45 hereinbefore referred to. When one is loosened and the other tightened, it causes the stud screws 50 to move in the elongated slots of the ring 35 and as they are tight in the ring 42, this causes the ring 42 to turn relative to the tap body 1 and when the position of this ring 42 is changed, the cross pin 39 moves with it and, as the pin is fitted into the core piece, the core piece also turns, thus circularly adjusting the cam surfaces 28 of the core piece and thereby adjusting the chaser slide blocks 6 and chasers 15 to regulate their position for cutting larger or smaller diameters of threads.

For the purpose of regulating the length of the thread to be cut, the trip ring 43 is adjustable by screwing it into or out of the housing ring 51 clamped over a flange of the adjusting ring 42.

In this improved structure, the tap body 1 revolves when the trip ring 43 contacts with the work. At this time, the ring 43 stops rotating together with the housing ring 51 which bears against the bearings of a plate 52 located between the rings 51 and 42, and all mounted on a sleeve 52' carried by the body 1, the tap body and rings 30, 35 and 42 rotating together by reason of the rollers 48 extending into the slots 49 of the body. The plate 52 is provided with a series of balls 51' which engage the rings 51 and 42.

When using this tap on a vertical spindle machine, the weight of the core piece and associated parts must be compensated for. Otherwise, they would remain down and the tap might be reset before being moved out of the coupling. Therefore, a spring 52" or other counterbalancing means may be utilized for holding up the weight of these parts. In practice, one end of this spring is attached to the inner end of the core piece with its other end suitably supported and will hold up approximately two-thirds of the weight, the chaser blocks when in collapsed position also assisting in holding the weight of the parts since the inclined ends 13 of the blocks will overlap the inclined end 44 of the core piece.

In practice, a floating adapter is used to properly align the tap with the center of the coupling to be threaded and maintain it there while the spindle of the machine is rotating the tap. For this purpose, the flange 53 of the shank that fits the spindle of the machine for rotating the tap is, together with a flange 54 of the tap body 1, utilized to form the adapter.

In engagement with these flanged surfaces and between the same is a plate 55 and these three parts, the tap body flange, the shank flange and the intermediate plate 55 are secured together by three shoulder screws 56 so as to permit a certain amount of side play. The plate 55 is provided with a pair of elongated slots 180 degrees apart and into these slots 55' extend rollers carried by two screws 56' projecting from the flange of the tap body.

Carried by the shank flange 53 at ninety degrees apart are two screws also provided with rollers extending into two elongated slots in the plate 55.

The shank flange 53 does not float but the above arrangement permits the tap to move or turn circumferentially relative to the plate 55 by means of certain of the elongated slots in one direction and the plate and tap to move or turn circumferentially together relative to the shank 53 by other elongated slots in an opposite direction, thus giving a floating connection to the tap at all times.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A collapsible tap comprising a body, a series of circularly formed radially shiftable chasers, radially sliding blocks carried by the body and supporting the chasers, said blocks having cam formed faces at their inner opposed ends, a core piece located centrally of the body and having cam faces co-operating with the cam faces of the blocks, and means for rotating the core piece thereby to radially adjust the blocks and chasers, the cam faces of the core piece having a tapered formation in the axial direction of the core piece whereby, on the relative movement of the core piece and body, the chasers will be radially shifted to cut a tapered thread, said blocks having an angular inner end and said core piece having an angular end co-operating with the angular end of the blocks for permitting the collapse of the chasers, and means for collapsing the chasers.

2. A collapsible and receding tap comprising a sectionally formed housing comprising a series of annular members, a body located therein, said body and housing having a relative movement, a core located centrally of the body, said body and core having relative longitudinal movement and circular movement, means connecting the core with the housing, means for shifting the housing relative to the body thereby to shift the core relative to said body, means for rotating the core relative to the body, said core being of interchangeable form, a series of radially shiftable slides, an interchangeable nose for supporting said slides on the body, and a series of circularly formed cutters carried by the slides and located angularly with relation thereto, said slides and core having co-operating cam faces at the inner ends of the slides and extending circularly of the core and tapered lengthwise thereof whereby the slides and cutters will be adjusted radially and also shifted radially to cut a tapered thread, the relative longitudinal movement of the core and body automatically shifting the cutters radially to cut such tapered thread.

3. A collapsible and receding tap comprising a sectionally formed housing comprising a series of annular members, a body located therein, said body and housing having a relative movement, a core located centrally of the body, said body and core having relative longitudinal movement and circular movement, means connecting the core with the housing, means for shifting the housing relative to the body thereby to shift the core relative to said body, means for rotating the core relative to the body, said core being of interchangeable form, a series of radially shiftable slides, an interchangeable nose for supporting said slides on the body, a series of circularly formed cutters carried by the slides and located angularly with relation thereto, said slides and core having co-operating cam faces at the inner ends of the slides and extending circularly of the core and tapered lengthwise thereof whereby the slides and cutters will be adjusted radially and also shifted radially to cut a tapered thread, the relative longitudinal movement of the core and body automatically shifting the cutters radially to cut such tapered thread, and means for counterbalancing the core when the tap is used in a vertical position.

4. A collapsible automatically operative tap comprising means acting automatically and independently of any supervisory act on the part of an attendant, periodically or at regular recurring intervals, gradually to retract the cutter and then collapse the same and a body, a series of radially shiftable sliding blocks carried thereby, a series of circularly formed chasers carried by said blocks, said blocks and chasers having co-operating means for positioning the chasers relative to the blocks, and means located axially of the body and co-operating with the inner ends of the blocks for radially adjusting the blocks and for radially shifting them relative to the work, said means being stationary during the threading of the work while the cutters move therealong to thread the work, the said stationary means being in the same longitudinal position with relation to the work from the beginning to the end of the threading operation.

5. A collapsible automatically operative tap comprising means acting automatically and independently of any supervisory act on the part of an attendant, periodically or at regular recurring intervals, gradually to retract the cutter and then collapse the same and a body, a series of radially shiftable cutters carried thereby, radially sliding blocks carried by the body for supporting the cutters, and means in operative engagement with the inner ends of the blocks for adjusting the cutters radially of the body, said means being stationary while the cutters move therealong to thread the work and co-operating with said cutters for automatically shifting them radially to cut a tapered thread, the said stationary means being in the same longitudinal position with relation to the work from the beginning to the end of the threading operation.

6. A collapsible automatically operative tap comprising means acting automatically and independently of any supervisory act on the part of an attendant, periodically or at regular recurring intervals, gradually to retract the cutter and then collapse the same and a body, a series of circularly formed radially shiftable cutters carried thereby, radially sliding blocks carried by the body for supporting the cutters, and means in operative engagement with the inner ends of the blocks for adjusting the cutters radially of the body, said means being stationary while the cutters move therealong to thread the work and co-operating with said cutters for automatically shifting them radially to cut a tapered thread, the said stationary means being in the same longitudinal position with relation to the work from the beginning to the end of the threading operation.

7. A collapsible automatically operative tap comprising means acting automatically and independently of any supervisory act on the part of an attendant, periodically or at regular recurring intervals, gradually to retract the cutter and then collapse the same and a body, a series of circularly formed radially shiftable cutters carried thereby, and axially located means, said means being stationary while the cutters move therealong to thread the work and co-operating with said cutters to effect the automatic shifting thereof radially inwardly during the threading operation to cut a tapered thread and having means for effecting the collapsing of the cutters inwardly on the completion of the cutting operation and also having means for adjusting the cutters radially of the body to set the cutters, the said stationary means being in the same longitudinal position with relation to the work from the beginning to the end of the threading operation.

8. A collapsible automatically operative tap comprising means acting automatically and independently of any supervisory act on the part of an attendant, periodically or at regular recurring intervals, gradually to retract the cutter and then collapse the same and a body, a series of circularly formed radially shiftable cutters carried thereby, and axially located means, said means being stationary while the cutters move therealong to thread the work and co-operating with said cutters to effect the automatic shifting thereof radially inwardly during the threading operation to cut a tapered thread and having means for effecting the collapsing of the cutters inwardly on the completion of the cutting operation, said axially located means comprising a core tapered in the direction of its length and conforming to the taper to be imparted to the work whereby the taper on the work will correspond to the exact taper on the core, the said stationary means being in the same longitudinal position with relation to the work from the beginning to the end of the threading operation.

9. A collapsible tap comprising a body, a series of radially sliding blocks carried thereby, circular chasers carried by the blocks and angularly located relative thereto and each having its back face ground off in a straight direction or plane, one to a greater extent than the preceding chaser, and an axially located core piece, said core piece being stationary while the chasers move therealong to thread the work and having a circular series of cam faces tapered in the direction of the length of the core and corresponding in number with the number of the chasers and co-operating with said cutters to effect the automatic shifting thereof radially inwardly during the threading operation to cut a tapered thread and also having means for effecting the collapse of the cutters on the completion of the cutting operation, means for rotating the core piece, thereby radially to adjust the cutters, and a work engaging structure freely rotatable relative to the body during the thread cutting operation.

10. A collapsible tap comprising a body, a series of circularly formed radially shiftable cutters, radially sliding blocks carried by the body for supporting the chasers, said blocks having cam formed faces at their inner opposed ends, and a core piece located centrally of the body and having cam faces corresponding in number with the number of cutters and having a tapered formation in the direction of the length of the core and said core piece being stationary while the cutters move therealong to thread the work and co-operating with said blocks to effect the automatic shifting of the cutters radially inwardly during the cutting operation to cut a tapered thread, said core piece having means for effecting the collapsing of the cutters inwardly on the completion of the cutting operation, said body and core piece having a relative longitudinal movement and a relative circular movement whereby, during the relative circular movement, the cutters will be radially adjusted and during the relative longitudinal movement the cutters will be automatically shifted radially.

11. A collapsible tap comprising a body, a core member located centrally of the body, said body having a longitudinal movement relative to the core during the cutting of a thread and said core having a longitudinal movement relative to the body to set the chasers, said core and body also having a relative rotational movement, a series of radially shiftable chasers carried by the body and co-operating with the core whereby during the relative rotational movement, the cutters will be radially adjusted and, during the longitudinal movement of the body relative to the core, the cutters will be automatically radially shiftable inwardly to cut a tapered thread, and a work engaging structure freely rotatable relative to the body during the thread cutting operation.

12. A collapsible tap comprising a body, a circularly formed housing therefor, said body and housing having a relative longitudinal movement and a part of said housing and body having a relative rotatable movement, a core located centrally of the body and connected with the housing, said body having a longitudinal movement relative to the core during the cutting of a thread and said core having a longitudinal movement relative to the body to set the chasers, said core and body also having a relative rotational movement, a series of chasers, and a series of radially slidable blocks carried by the body for supporting the chasers thereon, said blocks and core having co-operating means whereby, on the longitudinal movement of the body relative to the core the chasers will be radially shifted inwardly to cut a tapered thread and on the relative rotational movement of the body and core, the chasers will be radially adjusted.

13. In an automatically operative tool for forming taper threads, the combination of a tool body; means, comprising a cutter movably mounted on the body, for cutting a thread when the tool body and the work to be threaded are given relative rotational and axial movements; and means movably supported on the tool body and automatically operable independently of any supervisory act on the part of an attendant, periodically or at regular recurring intervals, by relative axial movement of the said body and the work gradually to retract the cutter relative to the work during the thread-cutting operation, said means comprising a slide mounted for movement on the body parallel to the axis thereof and a work engaging structure freely rotatable on the slide during the thread-cutting operation.

14. In an automatically operative tool for forming taper threads, the combination of a tool body; means, comprising a cutter movably mounted on the body, for cutting a thread when the tool body and the work to be threaded are given relative rotational and axial movements; and means movably supported on the tool body and automatically operable independently of any supervisory act on the part of an attendant, periodically or at regular recurring intervals, by relative axial movement of the said body and the work gradually to retract the cutter relative to the work during the thread-cutting operation, said means comprising a slide mounted for movement on the body parallel to the axis thereof, a structure freely rotatable on the slide during the thread-cutting operation and comprising a work-engaging member adjustable axially of the tool body.

15. A collapsible automatically operative tap comprising means acting automatically and independently of any supervisory act on the part of an attendant, periodically or at regular recurring intervals, gradually to retract the cutter and then collapse the same and a body, a series of circularly formed radially shiftable cutters carried thereby, axially located means stationary during the movement of the cutters therealong during the cutting of the work and co-operating with said cutters to effect the automatic shifting thereof radially inwardly during the threading operation to cut a tapered thread and having means for effecting the collapsing of the cutters inwardly on the completion of the cutting operation, and a work engaging structure freely rotatable relative to the body during the thread cutting operation.

16. In an automatically operative tool for forming taper threads, the combination of a tool body, means comprising a cutter movably mounted on the body for cutting a thread when the tool body and the work to be threaded are given relative rotational and axial movements, and means movably supported on the tool body and automatically operable independently of any supervisory act on the part of an attendant, periodically or at regular recurring intervals, by relative axial movement of the said body and the work gradually to retract the cutter relative to the work during the thread cutting operation, said means comprising a slide mounted for movement in the body parallel to the axis thereof, and a work engaging structure freely rotatable relative to the body.

WILLIAM J. HOGG.